(12) United States Patent
Lu et al.

(10) Patent No.: US 10,559,934 B2
(45) Date of Patent: Feb. 11, 2020

(54) MULTIFUNCTIONAL ROTARY DATA MEMORY

(71) Applicant: SHENZHEN DNS INDUSTRIES CO., LTD., Shenzhen, Guangdong (CN)

(72) Inventors: Zongkai Lu, Guangdong (CN); Yang Yang, Guangdong (CN)

(73) Assignee: SHENZHEN DNS INDUSTRIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/312,242

(22) PCT Filed: Jul. 20, 2016

(86) PCT No.: PCT/CN2016/090651
§ 371 (c)(1),
(2) Date: Dec. 20, 2018

(87) PCT Pub. No.: WO2017/219428
PCT Pub. Date: Dec. 28, 2017

(65) Prior Publication Data
US 2019/0348807 A1    Nov. 14, 2019

(30) Foreign Application Priority Data

Jun. 20, 2016 (CN) .................. 2016 2 06058123 U

(51) Int. Cl.
*H05K 5/00* (2006.01)
*H05K 7/00* (2006.01)
(Continued)

(52) U.S. Cl.
CPC ......... *H01R 35/02* (2013.01); *G06F 13/1668* (2013.01); *G06F 13/4282* (2013.01); *G06F 2213/0042* (2013.01); *H01R 2201/06* (2013.01)

(58) Field of Classification Search
CPC ....................................................... H05K 5/00
See application file for complete search history.

(56) References Cited

U.S. PATENT DOCUMENTS

| 7,537,169 B2* | 5/2009 | Gonzalez ............. | G06K 19/077 235/380 |
| 2005/0066477 A1* | 3/2005 | Yang ....................... | G06F 1/162 16/374 |
| 2007/0105418 A1* | 5/2007 | Fu ........................ | H01R 13/665 439/136 |

FOREIGN PATENT DOCUMENTS

| CN | 2620935 Y | 6/2004 |
| CN | 201266490 Y | 7/2009 |

(Continued)

*Primary Examiner* — Jerry Wu
(74) *Attorney, Agent, or Firm* — Muncy, Geissler, Olds & Lowe, P.C.

(57) ABSTRACT

A multifunctional rotary data memory, comprising a housing, a master control module, a memory, a first connector, and a second connector. The housing has an upper housing and lower housing. The upper housing and lower housing are movably connected and can relatively and rotatably move around a pivot shaft. The first connector is mounted on the upper housing. The second connector is mounted on the lower housing. The first connector and the second connector are both communicatively connected to the master control module. This breaks through spatial and angular limitations on the connection between an Apple device and a periphery device, is a simple apparatus for an Apple device to possess both the functions of a data line and a mobile memory, and is compact in volume and easy to carry.

5 Claims, 5 Drawing Sheets

(51) Int. Cl.
*H01R 35/02* (2006.01)
*G06F 13/16* (2006.01)
*G06F 13/42* (2006.01)

(56) References Cited

FOREIGN PATENT DOCUMENTS

| | | |
|---|---|---|
| CN | 202068067 U | 12/2011 |
| CN | 203849999 U | 9/2014 |
| CN | 104599696 A | 5/2015 |
| CN | 204631858 U | 9/2015 |

\* cited by examiner

MULTIFUNCTIONAL ROTARY DATA MEMORY

TECHNICAL FIELD

The present invention relates to an electronic device, and more particularly, to a multifunctional rotary data memory.

BACKGROUND

Apple device is the first-line brand of today's global consumer electronic product, and has a large number of fans around the world due to the good user experience, commonly known as "iPhone fans" or "apple fans", but iPhone needs to consume a lot of storage spaces for photos or videos, the external storage space needs to be added when it is necessary, and sometimes data line needs to be used while communicating with other devices or charging, and both of them need to exist at the same time, the number of objects carried by the user shall be increased, and that is, the data line and the mobile memory are carried at the same time, which is very inconvenient.

Technical Solutions

The technical problem solved by the present invention is a simple two-in-one device that enables an Apple device to have a data line and a mobile memory at the same time, and can break through the connection space and angle limitations of Apple device and peripheral device. In order to solve the technical problem above, the technical solutions used in the present invention are as follows.

A multifunctional rotary data memory includes a housing, a master control module, a memory, a first connector, and a second connector, wherein the housing includes an upper housing and a lower housing, the upper housing and the lower housing are movably connected, and the upper housing and the lower housing can relatively and rotatably move around a pivot shaft; and the first connector is mounted on the upper housing, the second connector is mounted on the lower housing, and the first connector and the second connector are both communicatively connected to the master control module.

As an improvement solution, the first connector is a first lightning connector; and the second connector is a USB connector.

As an improvement solution, the upper housing includes a first baseplate, the lower housing includes a second baseplate, and the first baseplate and the second baseplate are rotatably connected through the pivot shaft.

As an improvement solution, a first through hole is arranged in a middle of the first baseplate, a second through hole is arranged in a middle of the second baseplate, and the second through hole is communicated with the first through hole for a conductor to pass through; the second baseplate is provided with a plurality of bulges standing and extending outwardly at a periphery of the second through hole, the plurality of bulges are arranged in circular and pass through the first through hole, so as to be served as the pivot shaft; and the first baseplate is provided with a shaft sleeve standing and extending inwardly at a periphery of the first through hole and corresponding to the plurality of bulges, and top portions of at least a part of the plurality of bulges are provided with reverse hooks so as to prevent the bulges from being separated from the first baseplate.

As an improvement solution, the multifunctional rotary data memory further includes a limiting structure, wherein the limiting structure includes the reverse hook and at least one convex block arranged at the periphery of the first through hole; and when the upper housing and the lower housing relatively rotate, the reverse hook and the convex block can be abutted together, so as to limit an angle range of relative rotation between the upper housing and the lower housing.

As an improvement solution, the multifunctional rotary data memory further includes a positioning structure, wherein the positioning structure includes a convex body arranged on the first baseplate, a groove arranged on the second baseplate and used for the convex body to slide, and an elastic positioning portion arranged on the groove, the elastic positioning portion is provided with a positioning concave portion; and the convex body can slide in and out the positioning concave portion while sliding in the groove.

As an improvement solution, two elastic positioning portions are arranged, including a first positioning portion and a second positioning portion, two positioning concave portions are also arranged, including a first positioning concave portion and a second positioning concave portion, and an included angle of two connecting lines between the two elastic positioning portions and a rotational center of the pivot shaft is greater than 45 degrees.

As an improvement solution, gaps are arranged between the plurality of bulges, the plurality of bulges are divided into low bulges and high bulges by height, wherein top portions of the high bulges are provided with the reverse hooks, and the reverse hook is a wedged edge picked out from the second through hole.

As an improvement solution, the multifunctional rotary data memory further includes a circuit board, wherein the circuit board is provided with a master processing unit, an Apple chip unit, and a memory card unit, and the master processing unit is respectively and communicatively connected to the memory, the Apple chip unit, and the memory card unit.

As an improvement solution, each of the upper housing and the lower housing includes a cover body with an opening and a cover plate mounted to the cover body, a cavity is formed by the cover body and the cover plate, the cover plate includes a first cover plate and a second cover plate, and the master control module is placed in the cavity of the upper housing or the lower housing.

As an improvement solution, the upper housing further includes a third connector, and the third connector is a second lightning connector.

Figure 1:
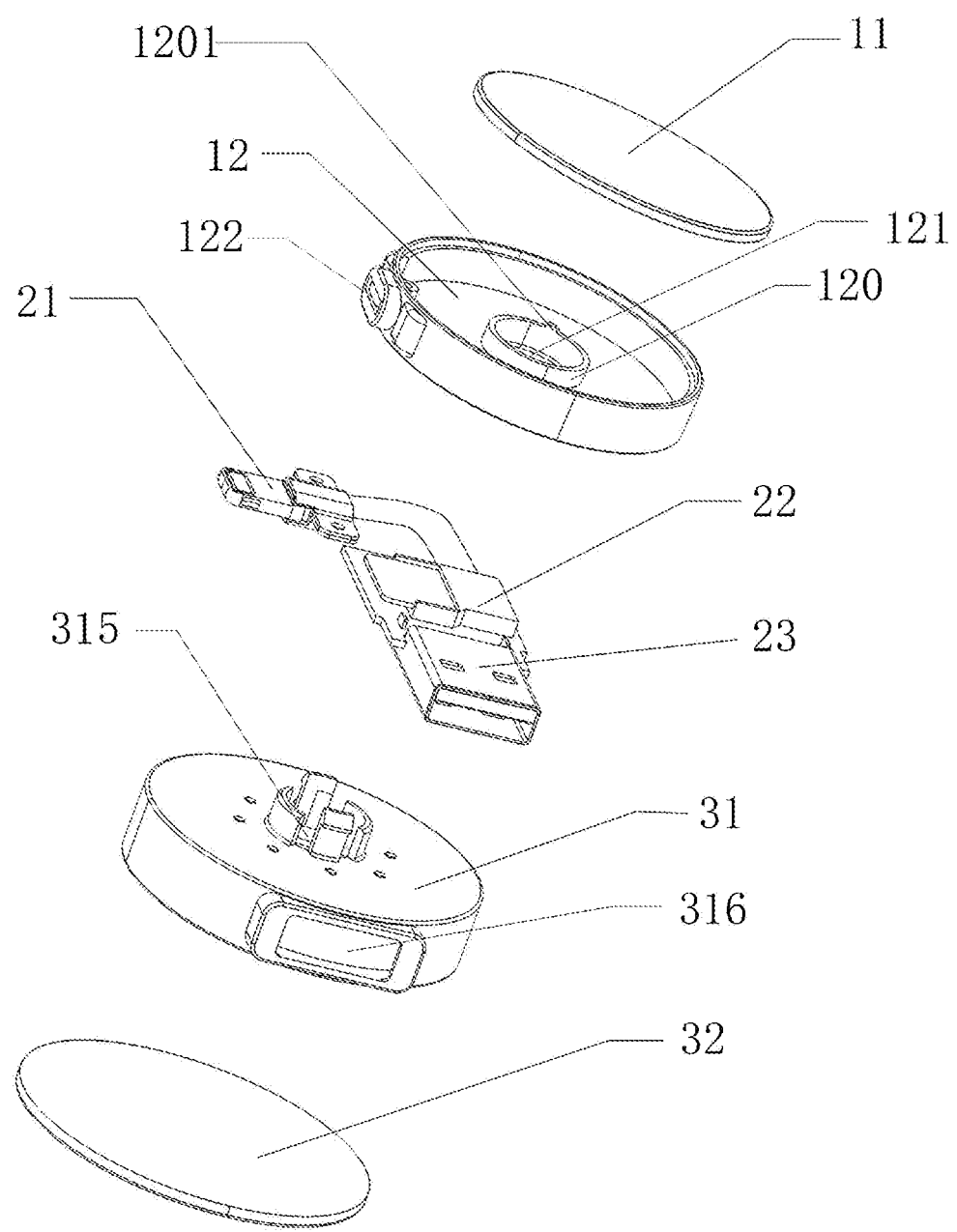
FIG. 1 is an explosive diagram of a multifunctional rotary data memory according to the first embodiment of the present invention.

In the drawings, 11 refers to first cover plate, 12 refers to first baseplate, 120 refers to shaft sleeve, 121 refers to first through hole, 122 refers to first hole opening, 123 refers to second hole opening, 1201 refers to bulge, 21 refers to first lightning connector, 22 refers to master control module, 23 refers to USB connector, 24 refers to second lightning connector, 31 refers to second baseplate, 32 refers to second cover plate, 310 refers to low bulge, 311 refers to high bulge, 3110 refers to reverse hook, 312 refers to groove, 313 refers to first positioning portion, 3130 refers to first positioning concave portion, 314 refers to second positioning portion, 315 refers to second through hole, 316 refers to hole, 3140 refers to second positioning concave portion, 1210 refers to convex body, 40 refers to master processing unit, 41 refers to memory 42 refers to Apple chip unit, and 43 refers to memory card unit.

DETAILED DESCRIPTION

The present invention is further described hereinafter with reference to the drawings and in the combination of the embodiments.

First Embodiment

Figure 2:
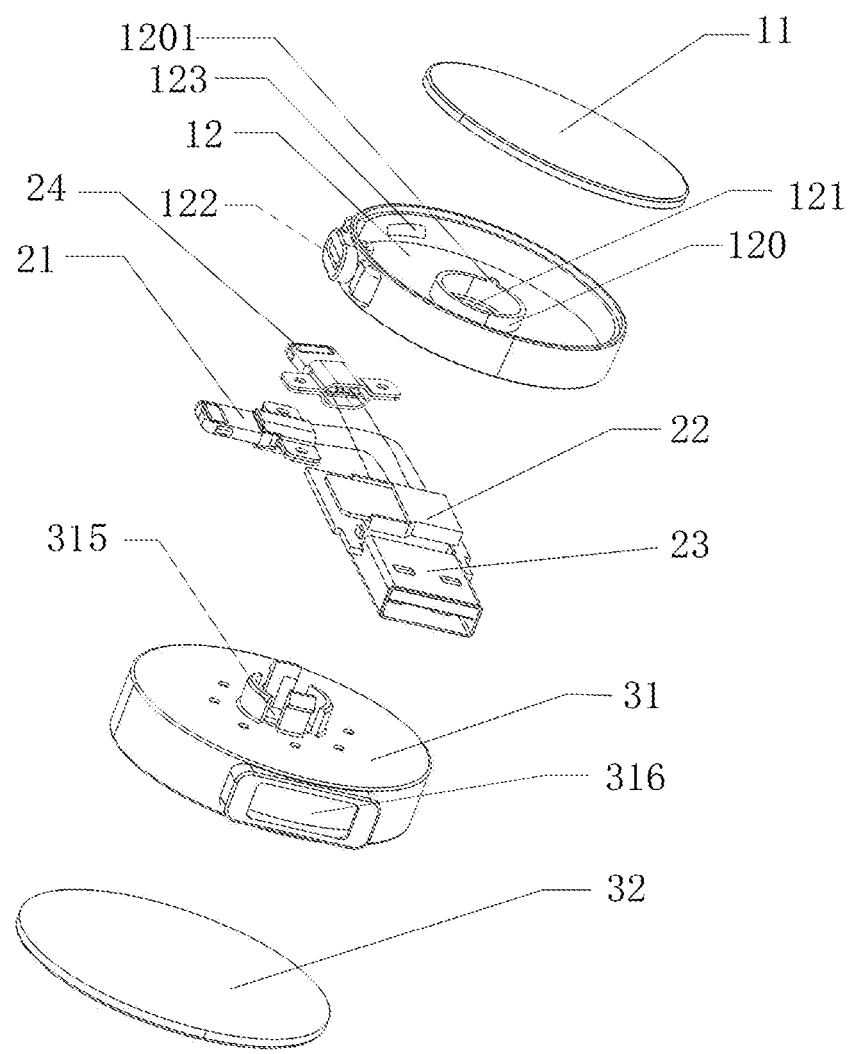
FIG. 2 is an explosive diagram of the multifunctional rotary data memory according to the second embodiment of the present invention.

As shown in FIG. 2, a multifunctional rotary data memory of the present invention includes a housing, a master control module 22 (built in, not shown in the figure), a lightning connector 21 and a USB connector 23.

As shown in FIG. 1, the housing includes an upper housing and a lower housing, wherein the upper housing includes a first cover plate 11 and a first baseplate 12, the first cover plate 11 is placed above the first baseplate 12, the lower housing includes a second baseplate 31 and a second cover plate 32, the second cover plate 32 is placed below the second baseplate 31, the first baseplate 12 and the second baseplate 31 are rotatably connected through a pivot shaft, the lightning connector 21 is mounted on the upper housing, the USB connector 23 is mounted on the lower housing, and the lightning connector 21 and the USB connector 23 are both connected to the master control module 22.

A first through hole 121 is arranged in a middle of the first baseplate 12, a second through hole 315 is arranged in a middle of the second baseplate 31, a periphery of the second through hole 315 is provided with a plurality of bulges standing and extending outwardly to the lower housing, the plurality of bulges are arranged in circular and pass through the first through hole 121, so as to be served as the pivot shaft, a side of the second baseplate 31 is provided with a hole 316 for the USB connector 23 to pass through and place, two positioning structures are arranged between edges of the second through hole and the second baseplate 31, including a first positioning portion 313 and a second positioning portion 314, two positioning concave portions are also arranged, including a first positioning concave portion 3130 and a second positioning concave portion 3140, the positioning structure includes a convex body 1210 arranged on the first baseplate 12, a groove 312 arranged on the second baseplate 31 and used for the convex body 1210 to slide, and an elastic positioning portion arranged on the groove 312, two elastic positioning portions are arranged, and the elastic positioning portion is provided with a positioning concave portion; and the convex body 1210 can slide in and out the positioning concave portion while sliding in the groove, an included angle of two connecting lines between the two elastic positioning portions and a rotational center of the pivot shaft is greater than 45 degrees, and the included angle is preferably 90 degrees in the embodiment.

A periphery of the second through hole is provided with a tubular shaft sleeve 120 standing and extending outwardly to the first cover plate 11, and corresponding to the plurality of bulges at a middle of the second baseplate 31, a side of the first baseplate 12 is provided with a hole opening 122 for the lightning connector 21 to pass through and place, and the convex body 1210 corresponding to two positioning structures is arranged between the first through hole 121 in the first baseplate 12 and the edge.

Figure 3:
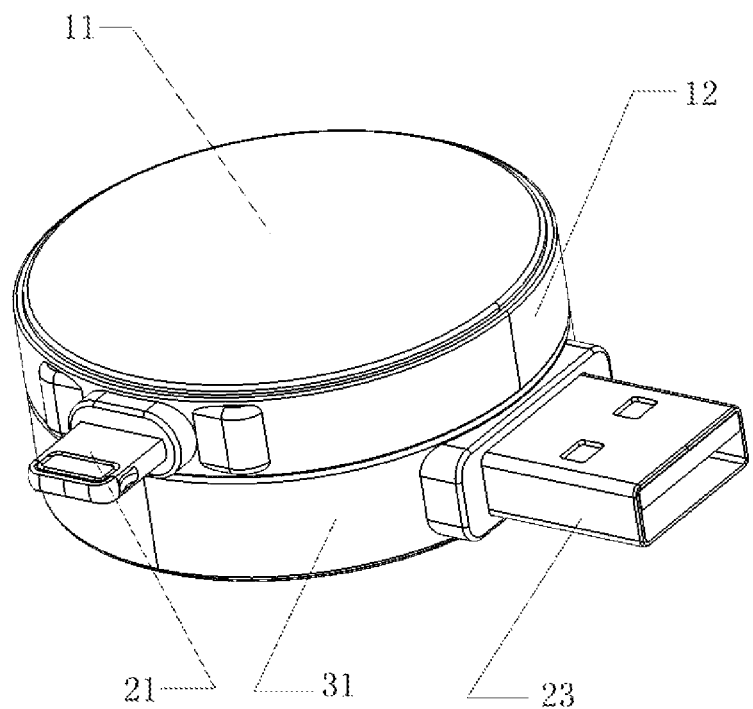
FIG. 3 is a stereoscopic diagram of the multifunctional rotary data memory according to the first embodiment of the present invention.

Each of the upper housing and the lower housing includes a cover body with an opening and a cover plate mounted to the cover body, a cavity is formed by the cover body and the cover plate, the cover plate includes a first cover plate 11 and a second cover plate 32, and the master control module 22 is placed in the cavity of the upper housing or the lower housing. As shown in FIG. 3, gaps are arranged between the plurality of bulges, the plurality of bulges are divided into low bulges 310 and high bulges 311 by height, wherein top portions of the high bulges 311 are provided with the reverse hooks 3110, the reverse hook 3110 is a wedged edge picked out from the second through hole 315, when the shaft sleeve 120 is clamped in the plurality of bulges through the reverse hook 3110, a spindle that the upper housing and the lower housing can relatively rotate is formed, and since a bottom surface height of the reverse hook 3110 is greater than a top surface height of the shaft sleeve 120, when the upper housing and the lower housing relatively rotate, the shaft sleeve 120 is capped and limited by the reverse hook 3110, so that the upper and lower housings cannot be separated from each other; the multifunctional rotary data memory is further provided with a limiting structure, the limiting structure includes the reverse hook 3110 and at least one convex block 1201 arranged at the periphery of the first through hole 121; when the upper housing and the lower housing relatively rotate, the reverse hook 3110 and the convex block 1201 can be abutted together, so as to limit an angle range of relative rotation between the upper housing and the lower housing, for example, the number of rotations does not exceed half a circle. The bulges of the limiting structure show a high and low level difference, which forms a gap for a connecting wire for communication between the main control module 22 and the lightning connector 21 to pass through, and the positioning structure is a bridge-shaped elastic piece with a concave portion in the middle, the elastic piece is generally close to an arc, an apex of the arc is located outside the lower housing, two sliding grooves are distributed in a semicircle where the positioning structure is located, the sliding groove, on the one hand, is a structure to enable the elastic piece to have elasticity, and on the other hand, is a region limiting the movement of convex body 1210, when the convex body 1210 is trapped in the lower concave, the upper housing and lower housing are in a positioning state, one of the positioning structures 313, the second through hole 315 of the second baseplate 31 and the hole 316 are distributed in a straight line direction, and when the convex body 1210 is positionally switched between the two positioning structures, the upper housing is rotated by 90 degrees with respect to the lower housing.

The mechanical working process of the present invention is briefly described below. When the convex body 1210 located on the first baseplate 12 falls on the first positioning portion 313, an included angle of a central connecting line between the lightning connector 21 located on the upper housing and the second through hole 315, and a central connecting line between the USB connector 23 and the second through hole 315 is stabilized at 180 degrees; when the upper housing is separately rotated, the upper housing is rotated counterclockwise by 90 degrees; at the moment, the convex body 1210 enters the concave position of the second positioning portion 314 from the concave position of the first positioning portion 313 along a track guided by the sliding groove, and at the moment, an included angle of a central connecting line between the lightning connector 21 located on the upper housing and the second through hole, and a central connecting line between the USB connector 23 and the second through hole is stabilized at 90 degrees; and during the rotation process, due to a limiting effect of the limiting structure, the connecting wire for communication between the master control module 22 and the lightning connector 21 cannot be broken by excessive rotation turns of the shaft.

Figure 5:
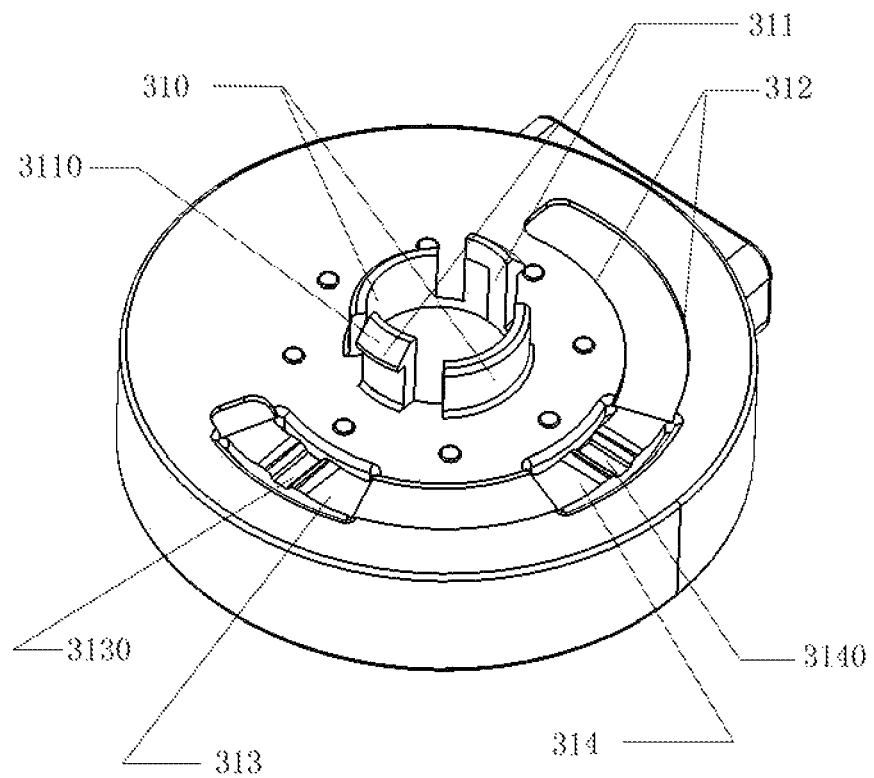
FIG. 5 is an exposed diagram of a second baseplate of the multifunctional rotary data memory according to the present invention.
Figure 6:
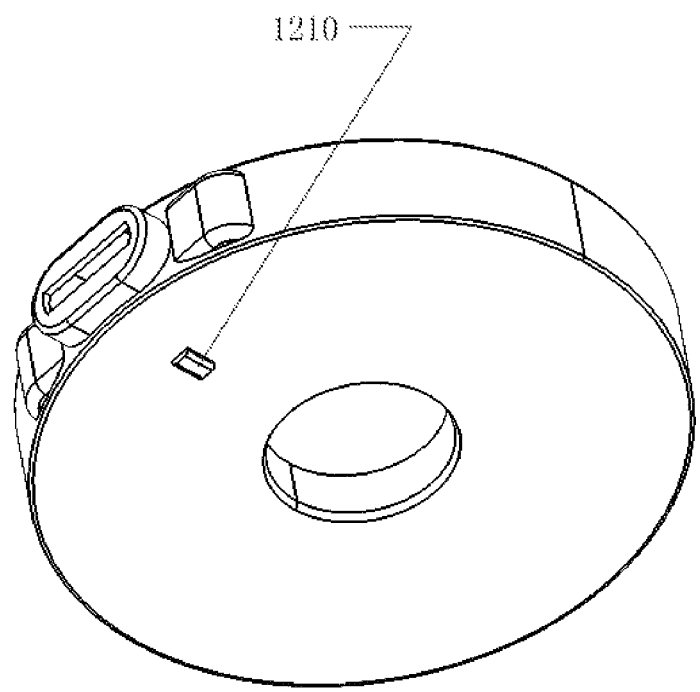
FIG. 6 is an exposed diagram of a first baseplate of the multifunctional rotary data memory according to the present invention.
Figure 7:
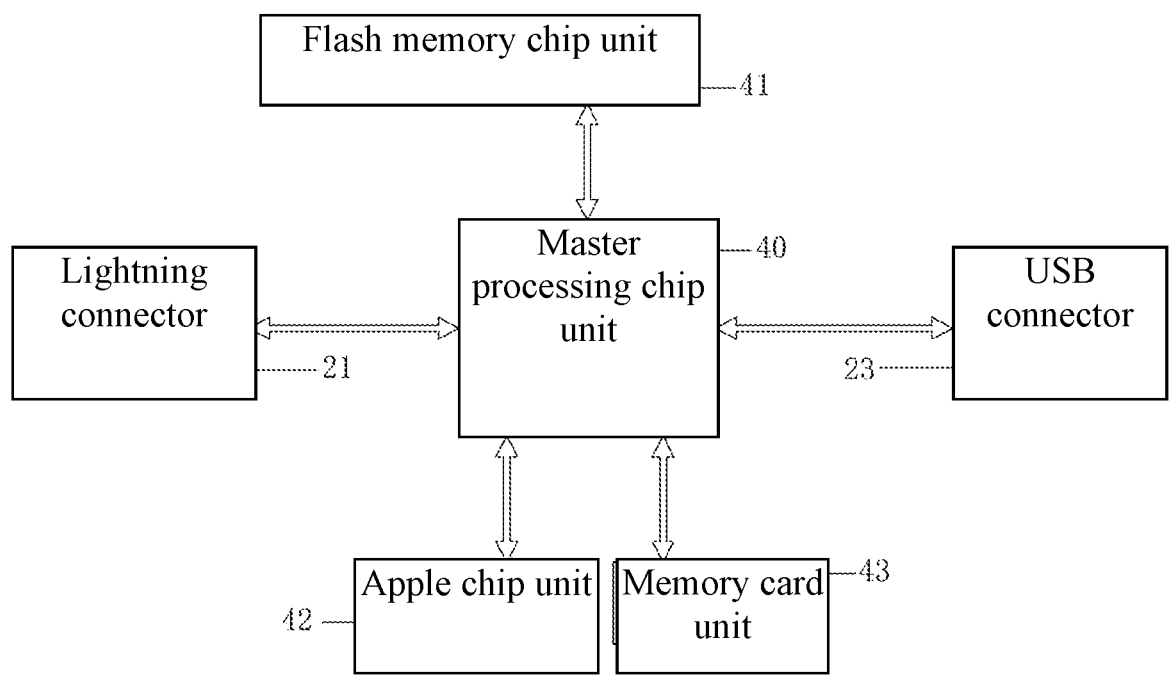
FIG. 7 is a block diagram of a circuit of the multifunctional rotary data memory according to the present invention.

As shown in FIG. 5, the drawing is a block diagram of a circuit of the present invention, the circuit includes the master processing unit 40, the lightning connector 21, the USB connector 23, the memory 41, the Apple chip unit 42, and the memory card unit 43. The master processing unit 40 is respectively connected to the memory 41, the Apple chip unit 42, and the memory card unit 43, and the lightning connector 21 is communicably connected to the USB connector 23. No. 21 place can also be connected to Micro USB, or TYPE-C terminal.

The brief operating principle of the circuit is as follows: when the USB connector 23 is separately connected to a computer device, the data of the computer device will be controlled by the master processing unit 40 to be transmitted to the memory 41 or the memory card unit 43 and the data is saved, and at the moment, the multifunction rotary data memory is equivalent to ordinary data storage; when the lightning connector 21 is separately connected to a mobile terminal, the data of the mobile terminal is controlled by the master processing unit 40 to be transmitted to the memory 41 or the memory card unit 43 and the data is saved, when the USB connector 23 is connected to the computer device and the lightning connector 21 is connected to the mobile terminal, the computer device and the mobile terminal can transmit data to each other, or the mobile terminal is charged through the computer device, and when the USB connector 23 is connected to a power supply and the lightning connector 21 is connected to the mobile terminal, the power supply will charge the mobile terminal; and in summary, the present invention has the dual function of data line and memory. The Apple chip unit 42 here discriminates whether the mobile terminal is the iPhone.

Second Embodiment

Figure 4:
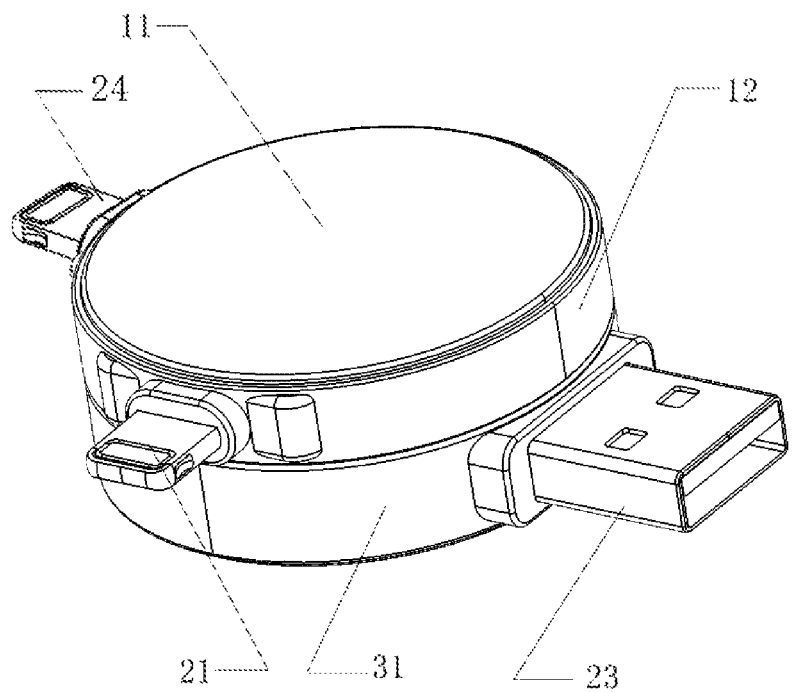
FIG. 4 is a stereoscopic diagram of the multifunctional rotary data memory according to the second embodiment of the present invention.

As shown in FIG. 2 and FIG. 4, other configurations are the same as those in the first embodiment, the difference lies in that a third connector is added to the upper housing, the third connector is also communicatively connected to the master control module, the third connector is the second lightning connector 24, and is mounted to a second hole opening 123, when the upper housing is not rotated, the second hole opening 123 is located at a position having a 90-degree included angle with the first hole opening 122 and is opposite to the hole 316.

The embodiments above only express preferred embodiments of the present invention, the description is relatively specific and detailed, but the embodiments cannot be understood as limiting the scope of the invention patent. It shall be indicated that many deformations and improvements, such as combination of different characteristics in each embodiment, etc. can be made by those skilled in the art on the premise of not deviating from the concept of the present invention, and all the deformations and improvements belong to the protection scope of the present invention.

The invention claimed is:

1. A multifunctional rotary data memory, comprising a housing, a master control module, a memory, a first connector, and a second connector, wherein the housing comprises an upper housing having a first side wall between a first baseplate and a first cover and a lower housing having a second side wall between a second baseplate and a second cover, the upper housing and the lower housing are movably connected, and the upper housing and the lower housing can relatively and rotatably move around a pivot shaft; the first connector is mounted on the first side wall, the second connector is mounted on the second side wall, and the first connector and the second connector are both communicatively connected to the master control module; the first baseplate and the second baseplate are rotatably connected through the pivot shaft; a first through hole is arranged in a middle of the first baseplate, a second through hole is arranged in a middle of the second baseplate, and the second through hole is communicated with the first through hole for a conductor to pass through; the second baseplate is provided with a plurality of bulges standing and extending outwardly at a periphery of the second through hole, the plurality of bulges are arranged in circular and pass through the first through hole, so as to be served as the pivot shaft; and the first baseplate is provided with a shaft sleeve standing and extending inwardly at a periphery of the first through hole and corresponding to the plurality of bulges, and top portions of at least a part of the plurality of bulges are provided with reverse hooks so as to prevent the bulges from being separated from the first baseplate.

2. The multifunctional rotary data memory according to claim 1, further comprising a limiting structure, wherein the limiting structure comprises the reverse hook and at least one convex block arranged at the periphery of the first through hole; and when the upper housing and the lower housing relatively rotate, the reverse hook and the convex block can be abutted together, so as to limit an angle range of relative rotation between the upper housing and the lower housing.

3. The multifunctional rotary data memory according to claim 1, further comprising a positioning structure, wherein the positioning structure comprises a convex body arranged on the first baseplate, a groove arranged on the second baseplate and used for the convex body to slide, and an elastic positioning portion arranged on the groove, the elastic positioning portion is provided with a positioning concave portion; and the convex body can slide in and out the positioning concave portion while sliding in the groove.

4. The multifunctional rotary data memory according to claim 3, wherein two elastic positioning portions are arranged, comprising a first positioning portion and a second positioning portion, two positioning concave portions are also arranged, comprising a first positioning concave portion and a second positioning concave portion, and an included angle of two connecting lines between the two elastic positioning portions and a rotational center of the pivot shaft is greater than 45 degrees.

5. The multifunctional rotary data memory according to claim 1, wherein gaps are arranged between the plurality of bulges, and the plurality of bulges are divided into low bulges and high bulges by height, wherein top portions of the high bulges are provided with the reverse hooks, and the reverse hook is a wedged edge picked out from the second through hole.

\* \* \* \* \*